Feb. 7, 1928. 1,658,293
M. LA LONDE ET AL
BRAKE ADJUSTING DEVICE
Filed March 29, 1927
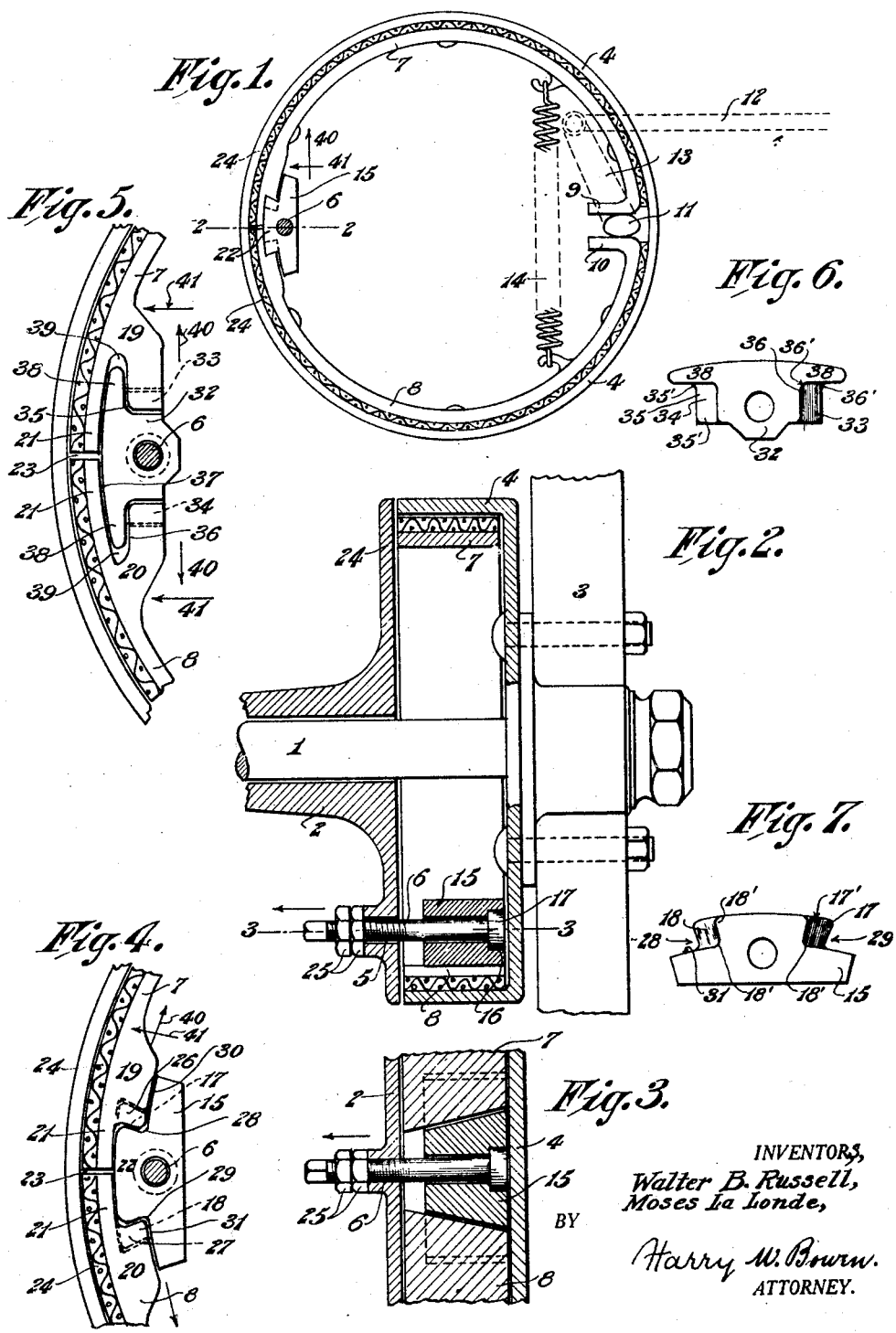
INVENTORS,
Walter B. Russell,
Moses La Londe,
BY
Harry W. Brown.
ATTORNEY.

Patented Feb. 7, 1928.

1,658,293

UNITED STATES PATENT OFFICE.

MOSES LA LONDE AND WALTER B. RUSSELL, OF SPRINGFIELD, MASSACHUSETTS; SAID LA LONDE ASSIGNOR TO SAID RUSSELL.

BRAKE-ADJUSTING DEVICE.

Application filed March 29, 1927. Serial No. 179,354.

This invention relates to improvements in brake adjusting devices, and more particularly to the adjustment of the internal or the emergency brake on a motor vehicle. An object is to provide a structure so that it may be readily adjusted from the outside of the brake housing without removing the wheel, which is a common practice at the present time.

A further object of the invention is to provide a device which permits the brake lining to wear uniformly throughout its length. At the present time the wear on the lining takes place only near the ends of the brake bands resulting in faulty braking of the machine.

A further object is to provide a flexible brake, that is to say, one which will adapt itself to all of the movements of the wheel and when the brake is applied during the forward or reverse motion of the car.

A further object is to provide a device by means of which the brake bands may be correctly adjusted, or as the term is sometimes used, a micrometer adjustment, a construction by means of which brake bands are accurately adjusted and so that the brakes on all the wheels would be set exactly the same amount. The present invention provides means for making instant brake readjustments, thereby permitting the brakes to be adjusted on the road. Other objects will appear in the body of the specification and will be particularly pointed out in the claims.

Referring to the drawings: Fig. 1 is a side elevation view showing the interior of the brake drum and means for properly adjusting the brake bands.

Fig. 2 is a partial or sectional view on the line 2—2, Fig. 1, showing a portion of the wheel attached to the brake drum, and the means for adjusting the block from the outside of the axle housing.

Fig. 3 is a detail sectional view on the line 3—3 Fig. 2, which illustrates the inclined surfaces of the adjusting block.

Fig. 4 is a view showing the block with inclined portions which engage the inclined portions of the brake bands.

Fig. 5 is a modification like Fig. 4 showing the brake bands overlapping the outer curved surface of the adjusting block and with the inclined surfaces of the brake bands in engagement with the inclined surfaces of the adjusting block, and Figs. 6 and 7 are detail views of the two adjusting blocks.

Referring to the drawings in detail: 1 designates the axle, 2 the axle housing, 3 the portion of the wheel to which the brake drum 4 is secured. 5 is a threaded opening in the axle housing which receives the threaded end of the brake block adjusting bolt 6. 7 and 8 designate the upper and lower brake shoes having the inturned ends 9 and 10 between which is placed the usual adjusting cam 11 which is operated by the foot of the driver through the connections 12 and 13. 14 contractile spring for simultaneously drawing the brake shoes inward against the cam 11 and block 15 or 32. 15 is a brake band adjusting block which is formed with an opening to receive the bolt 6 and recess 16 to receive the head 17 of the adjusting bolt 6. This block is formed with oppositely disposed inclined surfaces 17 and 18. The ends of the brake bands 7 and 8 are enlarged as indicated at 19 and 20 and are provided with the extension portions 21. These extension portions, it will be noticed, project or extend over the curved portion 22 of the block 15, whereby the ends of the brake bands are brought practically close together as indicated by the space at 23. This construction permits the lining 24 to extend completely around on the inner surface of the brake drum 4. This is clearly shown in Fig. 1, that is to say from the space 23 to the inturned portions 9 and 10. 25 are two lock nuts on the end of the bolt 6. It should be stated that the enlarged ends 19 and 20 of the brake bands are formed with inclined surfaces which rest on the inclined surfaces 17 and 18 of the block 15. These inclined ends are indicated at 26 and 27. The block 15 might, therefore be described as being formed with a notch in the outer side portion. This notch is indicated by the reference numerals 28 and 29. One surface of this notch, being as before stated, inclined and the other surface of the notch is formed on a plane at right angles to the outer surface of the block. These surfaces are indicated by the lines 30 and 31.

Referring to Figs. 5 and 6, which is a modification of the structure shown in Figs. 4 and 7, and indicated at 32. It is formed with the inclined surfaces 33 and 34. In this construction the notches are located on the inner part of the block instead of the outer portion as in Fig. 4. This notch is indicated at 35 and 36. The inclined surfaces of the brake bands 7 and 8 are located on the enlarged end portions 19 and 20 and engage the inclined surfaces 33 and 34 of the block 32. The bands 7 and 8 are formed with extensions 21 which lie over the outer curved surface 37 of the block and extend into close proximity to each other as indicated at 23.

The position of the brake bands 7 and 8 may be accurately adjusted in the axle housing by means of the bolt 6, which it will be understood forces the block 15 horizontally, which will cause the ends of the shoes to be moved outwardly on the inclined surfaces of the block and into engagement with the inner surface of the drum. After this adjustment is made the cam 11, when operated brings the brake lining of the bands into contact with the inner surface of the drum.

It will be seen from this description that block 15 or 32 may be inserted within the axle housing and the bolt 6 inserted and the brake bands with their linings assembled for use. The brakes may be adjusted from the outside by jacking up the car.

An important feature of our brake adjusting device is the end thrust principle involved, which rigidly and firmly retains the brake bands in their adjusted positions. This is accomplished by having the inner inclined ends of the bands bear against the inclined surfaces of the solid adjusting blocks and firmly retained in their adjusted positions by means of the bolt 6. This end thrust adjustment has the very important advantage of enabling the brakes to retain their firm hold on the inner surface of the brake drum when the car is moving either forward or rearward. Also this construction is such that the solid wedge shaped block automatically adjusts itself by moving the opposite ends equally in opposite directions whereby the entire semi-circular surface of the linings is brought into full braking operation. By having the overlapping ends or extensions 21, provision is made for applying the lining so as to cover the entire inner surface of the drum.

The notched blocks serve the additional purpose of effectually retaining the ends of the brake bands in place. In Fig. 4 the surfaces 30, 31 accomplish that purpose. In Fig. 5 the extensions or wings 38, which enter the recesses 39 in the end pieces 19 and 20 will effectually operate to retain the brake bands in their adjusted positions and against any possibility of their becoming displaced when in use.

In further explanation of the end thrust principle of the brake bands it should be stated that when the block 15 or 32 is operated to adjust the rear ends of the brake bands they will be positively retained in this position, then, when the cam 11 is operated the forward or front ends of the bands will be moved outward in the usual manner, with the result that the entire length of the lining will be brought into contact with the inner curved surface of the brake drum. In other words, the brake bands are always in concentric and parallel relation to the brake drum. This is an important feature, since the linings will always wear uniformly throughout their length. Also, this rear end thrust adjustment is effectual in holding the car in either a forward or rearward direction. When the cam 11 is operated the rear ends of the brake bands will turn slightly on the inclined surfaces of the adjusting blocks. In order to permit this slight movement the notches in the corners of these blocks are formed with slightly rounded corners, as indicated at 17' and 18' in Fig. 7 and 35' and 36' in Fig. 6. The end thrust is clearly indicated in Figs. 4 and 5 by means of the arrows 40 and 41 which show the directions of movements of the brake bands when the block 15 or 32 is operated by the bolt 6.

What we claim is:

1. A brake construction comprising in combination with a brake drum, an axle housing, a pair of brake bands in the drum and each having an extension part at one end, an adjusting block located between their ends and having the extension part located over and along an edge of the block to provide means for attaching brake lining to the extension, and means for operating the adjusting block from the outside of the housing.

2. In a brake adjusting device the combination with a brake drum, a pair of brake bands, each band being formed with inwardly extending portions at one end, their other ends each having an enlarged part that is formed with an inclined surface and an extension part which is located beyond the inclined surface to form a recess between the inclined surface and the extension part, an adjusting block having inclined surfaces and extensions which are located in the recesses of the enlarged part of the brake bands, and means for adjusting the block from the outside of the brake drum.

3. A brake shoe having an extension portion at one end, an inclined surface adjacent the extension portion and offset from said extension portion, the extension portion being for the purpose of attaching a brake lining thereto, and the inclined surface being for receiving an adjusting device, as described.

4. In combination, in a brake mechanism a rotatable brake drum, a pair of brake shoes located in the drum, each of said shoes having an extension part at one of its ends which terminates close to the extension part of the other shoe for receiving a brake lining that covers substantially the entire inner surface of the drum, and an inturned part at its other end, a device for moving the shoes outward and located within the extension part, cooperating surfaces between the said device and the brake shoes for moving the ends of the shoes in opposite and outward directions against the inner surface of the brake drum, and means for operating the device.

MOSES LA LONDE.
WALTER B. RUSSELL.